United States Patent [19]

Imanishi et al.

[11] Patent Number: 4,817,456
[45] Date of Patent: Apr. 4, 1989

[54] DYNAMIC BALANCING DEVICE FOR PRESS

[75] Inventors: Shozo Imanishi; Mitsuo Sato, both of Kanagawa, Japan

[73] Assignee: Aida Engineering, Ltd., Kanagawa, Japan

[21] Appl. No.: 852,717

[22] Filed: Apr. 16, 1986

[30] Foreign Application Priority Data

Sep. 7, 1985 [JP] Japan ................................ 60-198195

[51] Int. Cl.$^4$ .............................................. B30B 7/02
[52] U.S. Cl. ...................................... 74/604; 100/282
[58] Field of Search .................. 100/282; 74/509, 604, 74/603; 384/203, 206; 83/615, 632

[56] References Cited

U.S. PATENT DOCUMENTS

| | | | |
|---|---|---|---|
| 1,085,556 | 6/1914 | Evans | 74/590 |
| 2,312,590 | 3/1943 | Reynolds | 403/DIG. 8 |
| 3,205,728 | 9/1965 | Morris et al. | 74/590 |
| 3,422,688 | 1/1969 | Bruderer . | |
| 3,528,319 | 9/1970 | Ishida . | |
| 3,563,619 | 2/1971 | Evans | 384/203 |
| 3,695,090 | 10/1972 | Kita . | |
| 3,772,986 | 11/1973 | Kawagoshi et al. . | |
| 3,808,912 | 5/1974 | Voorhees et al. . | |
| 3,896,693 | 7/1975 | Johansson . | |
| 4,156,387 | 5/1979 | Dortmann | 100/282 X |
| 4,160,409 | 7/1979 | Portmann . | |
| 4,276,823 | 7/1981 | Rotzler | 100/282 X |
| 4,376,410 | 3/1983 | Wissman et al. . | |
| 4,397,232 | 8/1983 | Schockman et al. . | |
| 4,603,573 | 8/1986 | Ganago et al. . | |
| 4,607,732 | 8/1986 | Ikeoka et al. . | |

FOREIGN PATENT DOCUMENTS

| | | | |
|---|---|---|---|
| 2434266 | 1/1976 | Fed. Rep. of Germany | 100/282 |
| 60-180699 | 9/1985 | Japan . | |
| 452282 | 8/1936 | United Kingdom | 74/604 |

*Primary Examiner*—Richard E. Moore
*Attorney, Agent, or Firm*—Wenderoth, Lind & Ponack

[57] ABSTRACT

A dynamic balancing device for a press having a crankshaft, a connecting rod mounted on an eccentric portion of the crankshaft and connected to a slide at its free end. The balancing device has links mounted on the eccentric portion of the crankshaft and extending in the direction opposite the direction in which the connecting rod extends, a pair of balancing weights provided on opposite sides of the crankshaft and vertically movable; and a pair of levers having their one ends pivotally attached to the upper ends of corresponding balancing weights and having the other ends of corresponding balancing weights and having the other ends overlapped and pivotally connected with the links, the levers being pivoted on the press at their respective mid-portions.

5 Claims, 3 Drawing Sheets

DYNAMIC BALANCING DEVICE FOR PRESS

The present invention relates to a dynamic balancing device for a press.

BACKGROUND OF THE INVENTION AND PRIOR ART

In the prior art press, dynamic balance of the inertia force is maintained between a slide which moves vertically and a crankshaft which rotates eccentrically, the balance being maintained by means of balancing weights moving relative to the crankshaft or a slide movable via gears, levers, or links. This arrangement has made the whole structure large and complex and has presented many difficulties.

The present inventor has proposed a means to solve the defects of the prior art balancing means in Japanese Patent No. 60-180699.

The proposed means is characterized in that a connecting rod is fitted to the eccentric part of the crankshaft of the press, a link is attached to the head of the connecting rod, a pair of balancing weights are provided on both sides of the crankshaft near the center thereof in a manner so as to be movable in a direction opposite to the direction of movement of the press slide, and levers connected to the upper end of each balancing weight overlap at the center of the slide and are connected with the link, the levers being pivoted to the frame of the press at their mid-portion.

The above described means is superior to the prior art devices in that the balancing weights are provided inside the frame of the press, allowing effective use of the cavity space, and in that the construction is simple and compact. It is defective, however, in that because the levers connected to the balancing weights and the connecting rod connected to the slide are connected by means of a link, the point where the slide and the link member are balanced does not coincide with the axial center of the crankshaft, making the balance not quite perfect, and even defective.

OBJECTIVE AND BRIEF SUMMARY OF THE INVENTION

The present invention is as its object to overcome the above described defects in the prior art means and to improve on the means previously proposed by the present inventor.

According to the present invention, a link which is actuated integrally with a connecting rod is provided at a portion where the connecting rod connecting an eccentric member of the crankshaft and a slide is attached, while a pair of balancing weights which are movable in the direction opposite to the direction of the movement of a press slide are provided on both the forward and rearward sides of the connecting rod. Levers connected to each balancing weight at the upper ends thereof overlap at the center of the slide and are connected with the upper end of the link, the levers being attached to the frame of the press at their mid-portions. As the crankshaft is rotated, the slide is moved vertically by the connecting rod. The link also moves integrally with the connecting rod to cause a swinging motion of the levers with the respective connecting points as the center of the movement. As a result, when the slide moves upward, the balancing weights move downward and vice versa to dynamically balance the inertia force due to the mass of the slide.

In the present invention, the link connected with the lever which causes the balancing weight to move vertically is fitted on the eccentric portion of the crankshaft. This arrangement allows the points on which the link and the crankshaft act to coincide for perfect balancing.

Further, since the balancing weights are housed inside the crown of the press, the space inside the frame of the press is effectively utilized. Still further, a balancing device having a simple construction comprising a link attached to a crankshaft, levers connected with the link, and balancing weights connected to the link is provided.

DETAILED DESCRIPTION OF THE INVENTION

Figure 1:
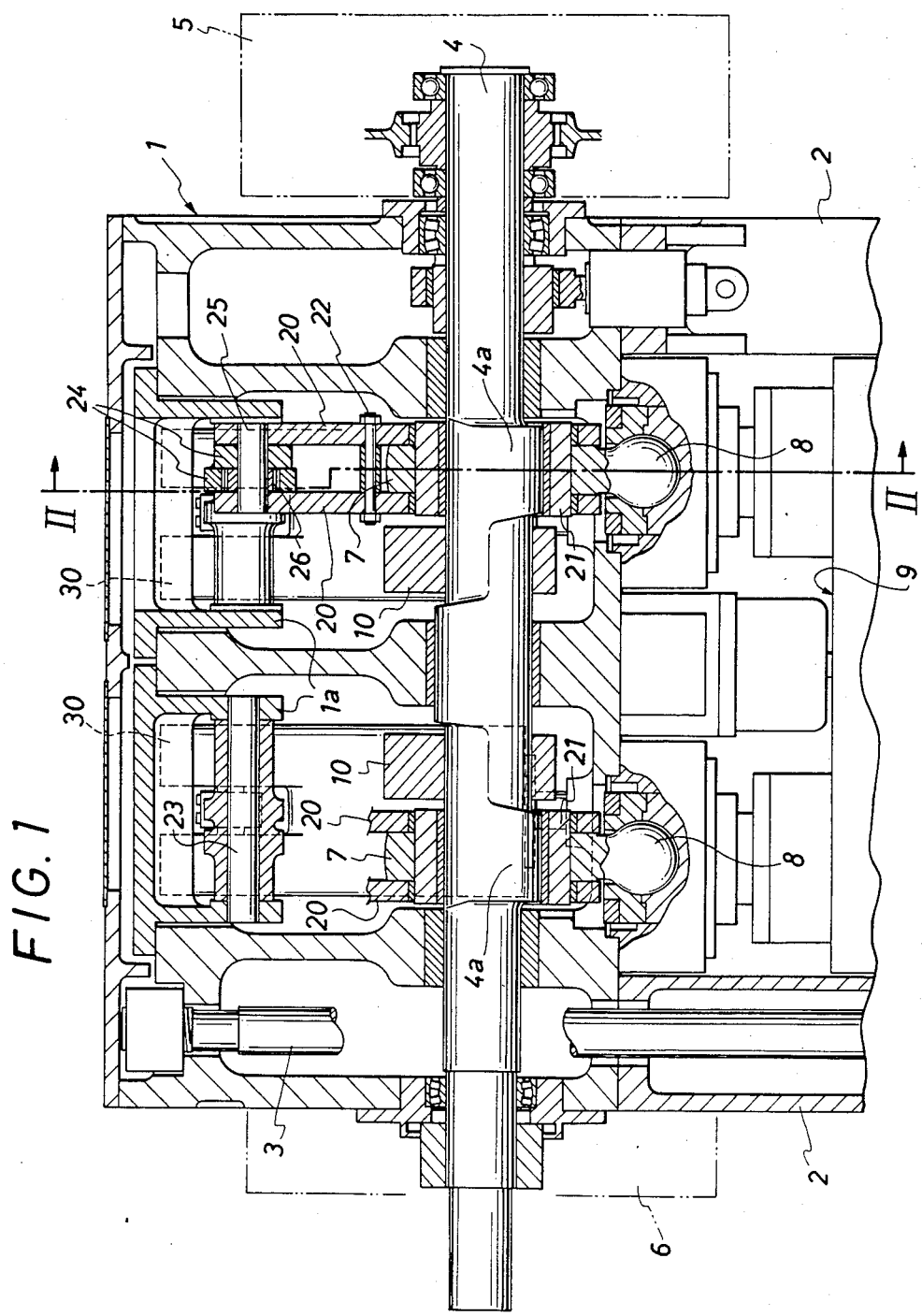
FIG. 1 is a vertically sectioned frontal view of the upper part of a press showing the essential parts thereof.

In FIG. 1, the upper part of the press comprises a crown 1 which is mounted on columns 2, and tie rods 3 which fixedly connect the press crown to a press bed (not shown). A crankshaft 4 extends through the crown 1 and a fly wheel 5 is attached on one end thereof which protrudes from the crown 1 and a brake 6 is attached to the other end thereof. A clutch (not shown) is contained inside the fly wheel 5 and is connected to a motor via a belt (neither being shown). Thus, the rotation of the fly wheel 5 which is driven by the motor is transmitted to the crankshaft 4 via the clutch.

Eccentric members 4a are formed at two locations on the crankshaft 4 and connecting rods 7 are attached to the eccentric members 4a. A slide 9 is connected to the rods 7 by spherical members 8 provided at the lower ends of the connecting rods 7. Further, balancing weights 10, are provided on the crankshaft 4 to counterbalance the eccentric members 4a for keeping the dynamic balance of the press.

The device according to the present invention will now be described in detail with reference to the drawings. Although two balancing means are provided, one at each of the respective eccentric members 4a of the crankshaft 4, the following description will refer to only one of them. It is noted that the construction and function of the other balancing means are identical to those of the described balancing means.

At teach eccentric member 4a of the crankshaft 4 is attached, in addition to the connecting rod 7, a link means in the form of a pair of links 20 which extend in the opposite direction (or upward) to the connecting rod. Referring now particularly to FIG. 1, a bushing 21 is mounted on the eccentric member 4a, and the connecting rod 7 is attached to the bushing 21. A link 20 is attached to the bushing on the forward and rearward sides of the connecting rod respectively. The links 20 are connected to each other at a mid portion thereof by means of a bolt 22.

Attaching frames 1a, which constitute a portion of the crown 1 are provided near the free ends of the links 20. Mounted on the attaching frames 1a is a pair of supporting shafts 23 extending parallel to the crankshaft of the press. The supporting shafts 23 have levers 24 pivotally mounted thereon and the portions extending toward the center of the press overlap and are connected to the upper ends of the links 20 by means of a shaft 25.

An eccentric bushing 26 is interposed between one of the levers 24 (e.g. the lever extending to the left from the shaft 25 in FIG. 2) and the shaft 25 for connecting it to the shaft 25. This is to cause the levers 24 to swing about the supporting shafts 23 by the vertical movement of the link 20. Because the free ends of the levers 24 tend to move in arcs with the respective supporting shafts 23 as the center, the levers and the links may become locked if connected by means of an ordinary shaft. The eccentric bushing 26 is therefore placed between one of the levers 24 and shaft 25 to prevent the two members from being locked.

Figure 2:
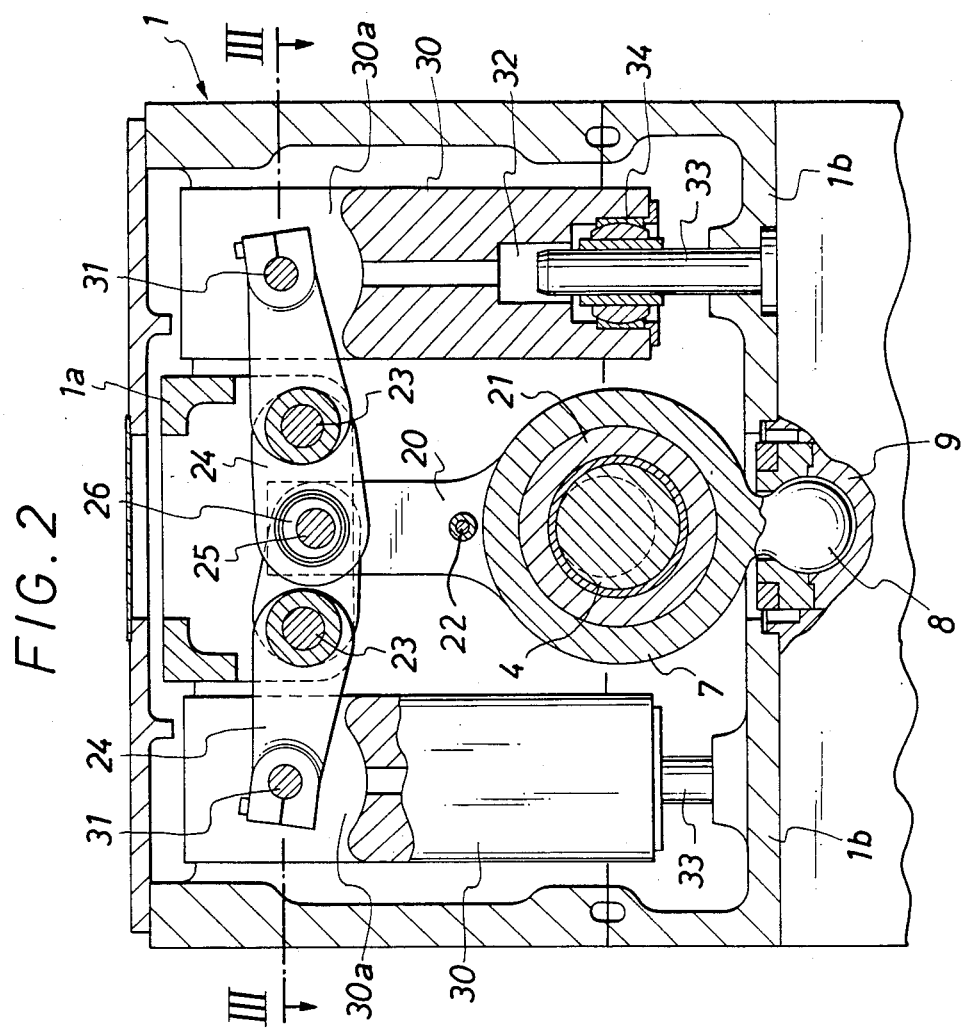
FIG. 2 is a sectional view taken along the line II—II in FIG. 1.
Figure 3:
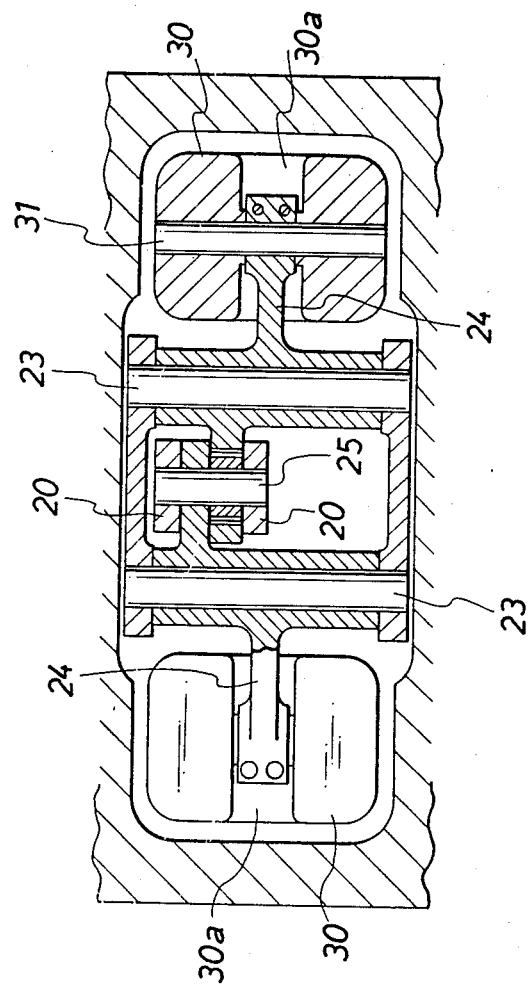
FIG. 3 is a sectional view taken along the line III—III in FIG. 2.

In FIG. 2, if attention is focused on the movement of the connecting shaft 25, the locus of the shaft 25 forms an arc defined by an arm of the left side lever 24, and the right side lever is connected with the left side lever through the eccentric bushing 26. Eccentric bushing 26 may be provided between both levers 24 and shaft 25.

Balancing weights 30 are provided inside the crown 1 on both sides of the crankshaft 4, the balancing weights being connected to the free ends of the levers 24 by means of pins 31. A slot 30a is provided in the center of each of the respective balancing weights 30 at the upper end thereof, and the levers 24 are inserted into the slots 30a and connected to the weights 30 by means of the pins 31. The balancing weights 30 also have holes 32 which extend vertically therein to receive guide posts 33 extending upward from the lower frames 1b of the crown 1. Ball joints 34 are provided between the guide posts 33 and the holes 32 through which the posts 33 slide.

Each hole 32 is bored in the center of the balancing weight 30 so that the upper end of the hole opens into the bottom of the groove 30a. Because the ball joint 34 is interposed between the guide post 33 and the hole 32, the balancing weight 30 can slide on the guide post 33 if its upper portion swings laterally during the vertical movement of the balancing weight 30.

As the crankshaft 4 is rotated, the connecting rod 7 causes the slide 9 to move vertically. At the same time, the links 20 provided on opposite sides of the connecting rod 7 moves vertically to cause the levers 24 to swing about the supporting shafts 25. The swinging motion of the levers 24 further causes the balancing weights 30 to move vertically along the guide post 33 in the opposite direction to the movement of the slide to dynamically balance the inertia force caused by the mass of the slide.

What we claim is:

1. A dynamic balancing device in combination with a press having a crankshaft, a connecting rod mounted on an eccentric portion of the crankshaft and connected to a slide at its free end, comprising:
    a link means mounted on the eccentric portion of the crankshaft and extending in a direction opposite to the direction in which the connecting rod extends;
    a pair of vertically movable balancing weights provided on opposite sides of the crankshaft; and
    a pair of levers each having first and second ends, each of said first ends pivotally attached to an upper end of a respective one of said balancing weights, said second ends overlapped with each other and pivotally connected with said link means, and said levers being pivoted on the press at their respective mid-portions.

2. A dynamic balancing device as claimed in claim 1 wherein said link means comprises a pair of links on opposite sides of said connecting rod and a connecting bolt connecting the mid-portions of said links.

3. A dynamic balancing device as claimed in claim 1 further comprising a shaft connecting said other ends of said levers and said link means and an eccentric bushing between at least one of said levers and said shaft.

4. A dynamic balancing device for a press having a crankshaft, a connecting rod mounted on an eccentric portion of the crankshaft and connected to a slide at its free end, said balancing device comprising:
    a link means mounted on the eccentric portion of the crankshaft and extending in the direction opposite to the direction in which the connecting rod extends;
    a pair of balancing weights provided on opposite sides of the crankshaft and vertically movable, each of the balancing weights having a groove at the upper end thereof and a hole extending therein open to the bottom thereof;
    respective guide posts on the press each of which projects upwardly into a respective said hole of one of said balancing weights for guiding said balancing weights during vertical movement thereof; and
    a pair of levers each having one of their ends pivotally attached to the upper end of a respective one of said balancing weights and the levers having their other ends overlapped with one another and pivotally connected with said link means, said levers being pivoted on the press at their respective mid-portions.

5. A dynamic balancing device as claimed in claim 4, and further comprising a respective ball joint in each of said holes and engaging the guide post extending therein.

* * * * *